United States Patent [19]

Mussallem, III

[11] Patent Number: 4,725,476

[45] Date of Patent: Feb. 16, 1988

[54] RUG UNDERLAY

[75] Inventor: Charles S. Mussallem, III, Jacksonville, Fla.

[73] Assignee: No-Muv Corporation, Inc., Jacksonville, Fla.

[21] Appl. No.: 49,790

[22] Filed: May 15, 1987

[51] Int. Cl.⁴ ................................................. B32B 3/28
[52] U.S. Cl. ...................................... 428/167; 156/148;
428/95; 428/172; 428/182; 428/234; 428/235;
428/239; 428/246; 428/252; 428/280; 428/282;
428/284; 428/287; 428/296; 428/300
[58] Field of Search ................. 428/167, 172, 95, 182, 428/234, 235, 239, 246, 252, 280, 282, 284, 287, 296, 300; 156/148

[56] References Cited

U.S. PATENT DOCUMENTS 4,504,537  3/1985  Mussallem ........................ 428/167
4,504,538  3/1985  Mussallem ........................ 428/167
4,668,559  5/1987  Mussallem ........................ 428/167

Primary Examiner—James J. Bell
Attorney, Agent, or Firm—Arthur G. Yeager

[57] ABSTRACT

A rug underlay comprising a centered layer of needle punched fiber batting, an upper outer corrugated layer of heat fused fibers, and a lower outer thin layer of a low friction polypropylene strips woven into a sheet. This article is used as a padding or an underlay for wall-to-wall carpeting.

20 Claims, 3 Drawing Figures

RUG UNDERLAY

BACKGROUND OF THE INVENTION

Wall-to-wall carpeting is usually installed with an underlay or padding to provide comfortable walking. It is somewhat difficult to install such carpeting over a normal underlay because of the need to stretch the carpeting toward the wall over an underlay that tends to cling to the carpeting. This causes uneveness in the underlay and the carpeting. Contrary to other carpet and underlay structures, in this instance it would be desirable for the face of the underlay which contacts the carpeting to be of low friction so the carpet can slide easily over the underlay during installation. Relative sliding after installation is not a problem since both the carpeting and the underlay are fixed around the entire perimeter.

The general structure of the overlay described in my U.S. Pat. Nos. 4,504,537 and 4,504,538 is admirably suited for the purposes of the present invention except for the central stiffening lattice and the upper layer which contacts the carpeting. My copending application Ser. No. 912,982 filed Sept. 29, 1986 now U.S. Pat. No. 4,668,559 discloses an underlay for wall-to-wall carpeting with a central layer of fiber batting, a lower outer layer of heat fused fibers in a corrugated pattern, and an upper outer layer of a low friction spun woven polyester scrim. While this product is quite satisfactory in many applications, the layer of scrim is somewhat fragile and does not resist rough handling as well as it should.

It is an object of this invention to provide an improved rug underlay having characteristics suitable for use with wall-to-wall carpeting. It is another object of this invention to provide a rug underlay of fibrous material having a uniform consistence, no unpleasant odor, and a clean appearance. It is still another object of this invention to provide a rug underlay having a carpet contacting surface that is abrasion-resistant has low friction and will permit carpeting to slide over it easily. Still other objects will be apparent from a more detailed description of this invention which follows.

BRIEF DESCRIPTION OF THIS INVENTION

This invention provides a rug underlay comprising a central needle punched fiber batting, a lower outer corrugated surface of partially heat fused fibers produced by heat fusing and corrugating the lower surface of said central layer and an upper outer thin layer of a low friction polypropylene tape woven into a sheet. In preferred embodiments of this invention the fiber batting comprises a mixture of a majority of polypropylene fibers and a minority of nylon fibers, polyester fibers, and cotton fibers.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
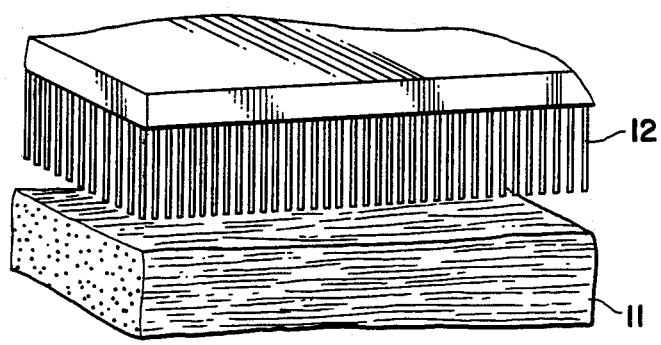
FIG. 1 is a schematic illustration in perspective indicating how a mass of fiber batting is needle punched into a compressed fibrous central layer.
Figure 2:
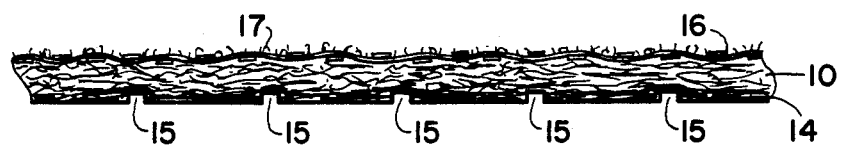
FIG. 2 is a cross section through the rug underlay of this invention.

The central core 10 of the rug underlay of this invention comprises a mass of fibrous material compressed into a layer about ¼ to ½ inch thick. This central core 10 can be made in any of several ways but it has been found most desirable to perform it by a needle punching operation which is depicted in FIG. 1. A mass of fiber batting 11 is subjected to a needle punching operation in a press in which a plurality of closely spaced, barbed needles 12 are punched through batting 11 enough times to compress the batting 11 to a very thin dense layer of intertwined fibers. It is preferable to subject a mass of fibers to a carding operation to produce fiber batting 11 with most of the fibers in the batting generally parallel with each other. Such a carded fiber batting produces a more desirable structure for this invention than a batting that has not been carded. Needle punching is a common operation employed in the fiber industry to intertwine fibers and filaments into a felt-like layer of material. In general a mass of fiber batting is needle punched to a thin layer which is then turned over and another mass of batting is applied to the opposite surface and needle punched again. These operations are repeated with new layers of batting applied to opposite sides of the needle punched layer until a central core 10 has been produced of the desired thickness, preferably about 5/16 inch. The fibers in the batting may be any type of natural or synthetic fibers, although synthetic are preferred such as polyolefin, nylon, polyester, acrylic polymer, etc. Preferably, the fibers are polypropylene of mixtures of a majority of polypropylene and a minority of nylon, polyester and cotton.

The central layer 10, as described above, is then treated to produce a lower layer 14 which will cling to any lower underlay or to the floor on which it is laid. Lower layer 14 is a surface of partially fused fibers having a stiff hard feeling as compared to the compressed fibers of the central core. Lower layer 14 also has some fiber ends projecting outwardly which can be sensed by rubbing this surface with one's fingers or by looking at the surface through a microscope. These fiber ends produce a good frictional contact with wooden or masonry flooring or with an underlay covering the floor. A preferred method of producing surface 14 is by applying sufficient heat to partially fuse the fibers at one of the outside surfaces of central layer 10 of needle punched fibers described previously. The corrugated appearance of lower layer 14 may be achieved by passing the underlay under a heated roller having a pattern of raised ridges. The roller is heated to a sufficiently high surface temperature to cause partial fusing of the fibers at the outer portion of layer 10 as they pass under the roller. This action produces a semistiff corrugated surface having a pattern of depressions or valleys 15 that provide an excellent grip for flooring or another underlay.

It is not critical that corrugated depressions 15 be in any particular design to provide the proper contact between the underlay and the flooring below the underlay. The design may be substantially parallel ridges and grooves, a geometric design such as squares, triangles, etc.; or any other design of ridges and valleys which will provide a good grip on the adjoining surface and, at the same time provide a good cushioning effect. A particularly preferred design is a simple "waffle" pattern of generally square configuration formed by intersecting depressions 15 about ½–1 inch apart. Each depression 15 being about 1/16 inch wide and 1/16 inch deep. Thus a generally square pattern reduces the tendency of the underlay to "creep" or move relative to the wall-to-wall carpeting which would result in bunching of the underlay below the carpeting to cause a nonlevel waviness in the carpeting.

Upper layer 16 is a thin layer of a low friction woven sheet bonded to the upper surface of the central core 10 of needle punched fibers so as to provide a slightly slippery contact with the underside of a carpet lying on that surface. This layer may be made of any suitable type of fiber, preferably polypropylene strip or tape woven into a sheet. Such a layer need not be more than about 0.01 inch thick. Layer 16 may be attached to central layer 10 by any of a variety of means. For example, layer 16 may be lightly needle punched onto the outside surface of central layer 10. An adhesive may be applied to the surface of central layer 10 and layer 16 pressed thereon. Still another procedure is to press layer 16 onto layer 10 and apply sufficient heat to cause a partial melting of the fibers at the interface, which upon cooling will be firmly intertwined with each other. Individual fibers and loops of fibers 17 project upwardly through layer 16 to provide a soft furry feeling. More of these fibers are present when layer 16 is attached by needle punching than when attached by an adhesive or by heat bonding.

Figure 3:
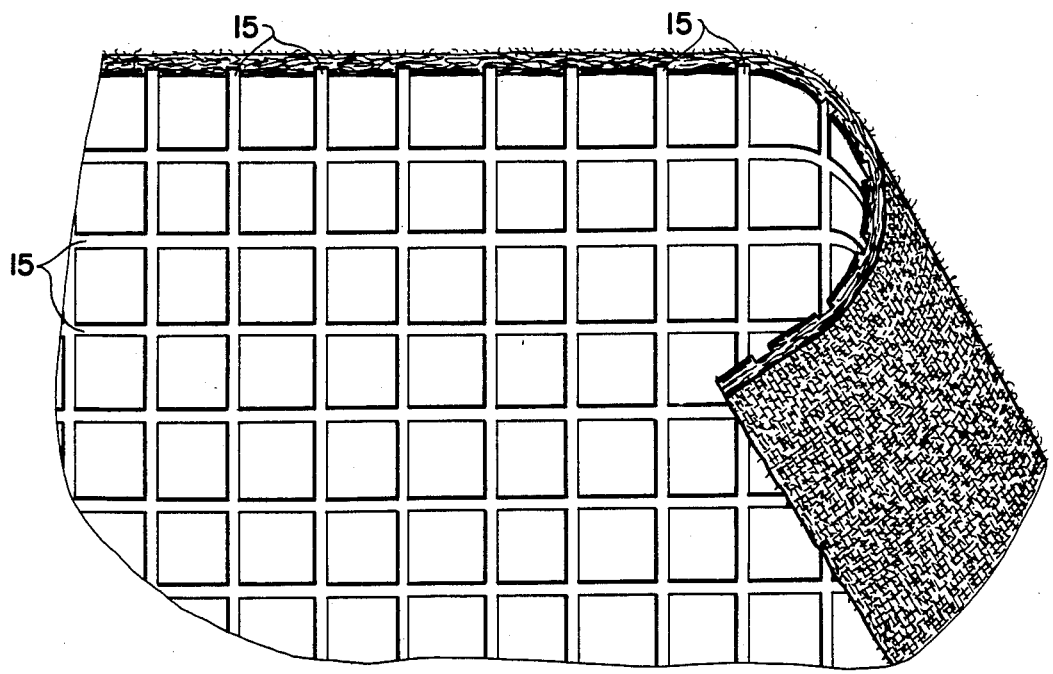
FIG. 3 is a plan view of the top layer of the rug underlay with a portion thereof folded so as to show the lower outside layer of the underlay.

FIG. 3 shows the general appearance of the underlay with corrugated surface of square depressions or grooves 15 on lower layer 14 and with the woven polypropylene tape in upper layer 16. An appropriately prepared underlay of the construction described above may have a thickness of about 5/16 inch for a weight of approximately 30 ounces or a thicker structure of about ½ inch for a weight of about 48–52 ounces. Thicknesses and weights between these extremes are also readily prepared as may be understood by those skilled in the art.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A rug underlay comprising a central layer of needle punched fiber batting, a lower outer corrugated layer of partially heat fused fibers produced by heat fusing and corrugating the lower surface of said central layer, and an upper outer thin layer of a low friction polypropylene tape woven into a sheet.

2. A rug underlay of claim 1 wherein said fiber batting and said fibers consist essentially of polypropylene.

3. A rug underlay of claim 1 wherein said fiber batting and said fibers comprise a major amount of polypropylene fibers and a minor amount of a mixture of nylon fibers, polyester fibers and cotton fibers.

4. A rug underlay of claim 1 wherein said lower outer layer is produced by applying a heated, corrugation-producing surface to one side of said central layer to cause melting of the fibers on the heated surface of that central layer.

5. A rug underlay of claim 1 wherein said upper outer thin layer of polypropylene tape is adhesively attached to said intermediate layer.

6. A rug underlay of claim 1 wherein said upper outer thin layer of polypropylene tape is attached to said central layer by being needle punched onto said central layer.

7. A rug underlay of claim 1 wherein said upper outer thin layer of polypropylene tape is attached to said central layer by being thermally treated to partially melt the interfacing fibers of said central layer and said upper outer layer.

8. A rug underlay comprising a compressed needle punched fibrous central layer, a lower outer layer of partially fused fibers in a corrugated pattern on one outside surface of said central layer and produced by fusing and corrugating one outside surface of said central layer, and an upper outer thin layer of a low friction, polypropylene thin strips woven into a sheet and attached to the other outside surface of said central layer.

9. A rug underlay of claim 8 wherein said fibrous layer comprises principally polypropylene fibers.

10. A rug underlay of claim 8 wherein said fibrous layer consists essentially of a mixture of a majority of polypropylene fibers, and minor amounts of nylon fibers, polyester fibers, and cotton fibers.

11. A rug underlay of claim 8 wherein said central layer is prepared by needle punching a batting of fibers into a thin compressed fibrous layer.

12. A method of preparing a rug underlay which comprises subjecting a mass of fiber batting to a carding process to make the fibers in said mass generally parallel to each other and subjecting the carded mass to the action of a needle punch press until the carded fiber batting is compressed into the desired thickness of a compressed fiber structure, subjecting the lower surface of the compressed fiber structure to heat and pressure to produce a corrugated surface of solidified heat softened fibers, and attaching to the upper surface of the compressed fiber structure a thin layer of a low friction woven sheet of polypropylene strips.

13. The method of claim 12 wherein the compressed fiber structure is about ¼ to ½ inch thick.

14. The method of claim 12 wherein the fibers of the batting comprise polypropylene fibers.

15. The method of claim 12 wherein the fibers of the batting comprise a mixture of a majority of polypropylene fibers and a minority of nylon fibers, polyester fibers, and cotton fibers.

16. The method of claim 12 wherein said attaching is accomplished by an adhesive applied between said central layer and said thin layer of polypropylene woven sheet.

17. The method of claim 12 wherein said attaching is accomplished by lightly needle punching said polypropylene sheet onto said central layer.

18. The method of claim 12 wherein said attaching is accomplished by applying heat to said layer of polypropylene sheet and to said central layer to cause partial melting of the fibers at the interface between said layers.

19. A rug underlay of claim 1 wherein said outer corrugated layer contains a generally square configuration to inhibit creeping of said underlay in any direction.

20. A rug underlay of claim 8 wherein said corrugated pattern is generally square throughout said one outside surface to set the fibers thereof and provide enhanced cushioning thereof.

* * * * *